US012810332B2

(12) United States Patent
Dixit

(10) Patent No.: US 12,810,332 B2
(45) Date of Patent: Nov. 24, 2026

(54) E-ORDER AND E-INVOICE INTEGRATION UTILIZING SAP STANDARDS AND MIDDLEWARE

(71) Applicant: Arnd Dixit, Brisbane (AU)

(72) Inventor: Arnd Dixit, Brisbane (AU)

(*) Notice: Subject to any disclaimer, the term of this patent is extended or adjusted under 35 U.S.C. 154(b) by 172 days.

(21) Appl. No.: 18/673,332

(22) Filed: May 24, 2024

(65) Prior Publication Data

US 2025/0363532 A1 Nov. 27, 2025

(51) Int. Cl.
*G06Q 30/00* (2023.01)
*G06F 16/25* (2019.01)
*G06Q 30/04* (2012.01)

(52) U.S. Cl.
CPC .......... *G06Q 30/04* (2013.01); *G06F 16/254* (2019.01)

(58) Field of Classification Search
CPC ... G06Q 30/04; G06Q 30/0635; G06F 16/254
See application file for complete search history.

(56) References Cited

U.S. PATENT DOCUMENTS 9,843,625 B2 * 12/2017 Pillai .................... H04L 67/10
2018/0196843 A1 * 7/2018 Bleacher ............ G06Q 40/123

* cited by examiner

*Primary Examiner* — Rokib Masud
(74) *Attorney, Agent, or Firm* — Cochran Legal, LLC; Colin Cochran, Esq.

(57) ABSTRACT

The present invention provides a method and system for managing sales orders using an e-order and e-invoice sales order management system by providing a graphical user interface (GUI) within the system, through which a user performs steps such as creating, modifying, and processing e-orders and e-invoices. The system receives unprocessed sales data from an external legacy system into a SAP application, and converts this data into a format recognizable by SAP standards, either with or without middleware and generates input data from the processed data, validates the input data based on predefined rules, and detects errors. The system creates and stores sales orders, outbound e-invoices, and inbound vendor invoices, and sends related transactional documents to endpoints. The validation process applies rules to various sales document levels, and the bot can automatically notify IT and business teams of errors via email.

19 Claims, 12 Drawing Sheets

Pre-Sales Monitoring Report

Refresh

| Exception | IDoc no. | Number | Detail | Pre-Sales | Sales Doc. | PO Date | Request.dlv.dt | Customer N | Customer Name | SaTy | IT/Business | Net Value | Curr. | SOrg. | TCode | Message Type | Order Type |
|---|---|---|---|---|---|---|---|---|---|---|---|---|---|---|---|---|---|
| | | 38 | | 1000000057 | | 01.03.2017 | | | Dynamic Industries | | | | | | | PDF | |
| | | 115 | | 1000000056 | | 01.03.2021 | 01.03.2021 | | Swisskrono | | | | | | | PDF | |
| | | 37 | | 1000000055 | | 01.03.2017 | | | Dynamic Industries | | | | | | | PDF | |
| | | 64 | | 1000000054 | | 24.11.2022 | 30.12.2022 | | Dynamic Industries | | | | | | | PDF | |
| | | 561 | | 1000000053 | | 10.11.2022 | 01.12.2022 | | Dynamic Industries | | | | | | | PDF | |
| | | 534 | | 1000000052 | | 22.09.2022 | 22.12.2022 | | Dynamic Industries | | | | | | | PDF | |
| | | 533 | | 1000000051 | | 22.09.2022 | 22.12.2022 | | Dynamic Industries | | | | | | | PDF | |
| | | 158 | | 1000000050 | | 07.06.2019 | 30.04.2021 | | The Potter Group Ely Bulk | | | | | | | PDF | |
| | 1 | 136 | | 1000000041 | | 05.02.2021 | 13.02.2021 | | The Potter Group Ely Bulk | | | 173,22 | | | | EDIFACT | |
| | | 323 | | 1000000040 | | 01.01.2020 | 03.01.2020 | | | | | | | | | Quick Entry | |
| | | 599 | | 1000000010 | | 03.01.2023 | 03.01.2023 | | Dynamic Industries | | | | | | | BAPI | |
| | | 594 | | 1000000009 | | 03.01.2023 | 03.01.2023 | | Dynamic Industries | | | 0,00 | EUR | | | BAPI | |
| | | 598 | | 1000000008 | | 03.01.2023 | 03.01.2023 | | Dynamic Industries | | | 0,00 | EUR | | | BAPI | |
| | | 597 | | 1000000007 | | 03.01.2023 | 03.01.2023 | | | | | 0,00 | EUR | | | BAPI | |
| | | 596 | | 1000000006 | | 03.01.2023 | 03.01.2023 | | | | | 0,00 | EUR | | | BAPI | |
| | | 218 | | 1000000005 | | 03.01.2023 | | | Dynamic Industries | | | 100,00 | EUR | | | BAPI | |
| | | 217 | | 1000000004 | | 03.01.2023 | | | Dynamic Industries | | | 100,00 | EUR | | | BAPI | |
| | | 216 | | 1000000003 | | 03.01.2023 | | | Dynamic Industries | | | 100,00 | EUR | | | BAPI | |
| | | 63 | | 1000000002 | | 03.01.2023 | 03.01.2023 | | | | | 0,00 | EUR | | | BAPI | |
| | | 62 | | 1000000001 | | 03.01.2023 | 03.01.2023 | | | | | | | | | BAPI | |
| | | 61 | | 1000000000 | | 03.01.2023 | 03.01.2023 | | | | | | | | | BAPI | |
| | | 93 | | 1063 | | 07.06.2019 | 30.04.2021 | | The Potter Group Ely Bulk | | | | | | | PDF | |

FIG. 9C

E-ORDER AND E-INVOICE INTEGRATION UTILIZING SAP STANDARDS AND MIDDLEWARE

FIELD OF THE INVENTION

The present invention relates to end-to-end sales order management and more particularly relates to system for sales order management and method of performing the same using the system.

BACKGROUND OF THE INVENTION

SAP (Systems Applications and Products) helps businesses and organizations manage and process large quantities of data and process management. In particular, sales order processing is an E2E process that requires efficient automated tools to manage effectively without requiring large quantities of person-hours.

One main challenge encountered while using SAP is that sales order processing business logic is typically distributed through many satellite systems and legacy landscapes. Companies often need to download files and upload files using multiple servers, sometimes requiring middleware or a converter. For example, the file formats sent by customer may be XML format and SAP cannot directly read this due to the compatibility issue and convert into a sales order which requires development costs and time.

However, configuring and maintaining middleware can add complexity and cost to the integration process. In large-scale operations where vast amounts of data are processed, even minor inefficiencies can have significant repercussions on both profitability and the allocation of human resources.

Typically, a business process ends with the invoicing, being orders need to be invoiced and suppliers from other systems can receive electronic invoices i.e. einvoices in their systems sent automatically with all the validations and the need of a middleware system to convert the format. Such middleware system introduces additional complexity to the IT infrastructure, requiring setup, configuration, and ongoing maintenance. This can incur significant costs, including licensing fees, implementation costs, and ongoing support expenses for the suppliers.

Furthermore, the SAP standard functionality does not have a single dashboard where you can monitor sales orders/Vendor Invoices and eInvoices and deliveries or upload data encoded in different formats such as Excel upload, PDF upload, EDIFACT upload, RFC, BAPI, Proxy, CSV, XML upload, IDOC monitoring (error analysis, issue resolution and solution) for the business end users. This inefficiency not only increases the workload for business users but also introduces the risk of data inaccuracies and inconsistencies.

Existing systems generally provide a transactional interface for IT that is complex, unsynchronized, and typically not suitable for end users who are business-oriented.

Prior art solutions have attempted to address various aspects of these challenges. For example, U.S. Pat. No. 11,386,468B2 discloses a dialogue monitoring and communications system using artificial intelligence (AI) based analytics, which aids in the management of communications but does not address the specific integration challenges of sales order processing within SAP systems. U.S. Pat. No. 8,965,957B2 describes a service delivery framework, which focuses on service management but lacks direct application to sales order data processing and integration. US20150081485A1 outlines a sales order data collection and management system, which partially addresses sales order management but does not fully integrate with SAP systems or handle multiple data formats efficiently. CN114462816A describes an enterprise ERP (enterprise resource planning) integrated management system based on the Internet of Things, which offers broad ERP functionalities but does not specifically cater to the unique requirements of sales order processing and middleware integration. U.S. Pat. No. 9,740,992B2 details a data warehouse system, which provides data storage solutions but does not solve the real-time integration and processing challenges for sales orders. CN111445174A and CN104182845A present sales order management systems with specific functionalities but lack comprehensive integration with SAP systems and multi-format data handling.

Hence, there is a need in the market for a tool that allows the placement of large orders and diverse ways of capturing orders other than manual entry and IDOCs, which is the standard SAP functionality. Such a tool should empower users with more possibilities to capture orders independently of other satellite systems or direct secured connections to other SAP systems or non-SAP ERP systems.

BRIEF SUMMARY OF THE INVENTION

It is an object of the present invention to provide a tool that allows placement of large orders and diverse ways of capturing orders other than manual entry and IDOCs while also allowing users to capture orders independent of other satellite systems or direct secured connection to other SAP systems or non-SAP ERP systems.

It is another object of the invention to provide a SAP system that provides intuitive interfaces and workflows for placing large orders, enabling users to input orders quickly and accurately while supporting bulk order entry, customizable templates, and predictive suggestions based on historical data.

It is another object of the invention to provide robust vendor invoice management capabilities through SAP ERP systems while providing automated invoice processing, approval workflows, integration with procurement modules, and real-time visibility into invoice status.

It is another object of the invention to utilize machine learning and artificial intelligence to automate product and order type analysis, such as automatically categorizing products and orders while ensuring seamless invoice handling process.

The present invention relates to a method and system for e-order and e-invoice management, aimed at streamlining and enhancing the processing of sales data within SAP applications. The invention leverages a combination of middleware, automated bots, and a graphical user interface (GUI) to facilitate efficient data processing, validation, error resolution, and documentation handling.

The present invention is capable of automatically converting document formats within the SAP enterprise resource planning (ERP) system, eliminating the need for a middleware system or a consulting entity to perform the development process. This streamlined process reduces costs and complexity while enhancing efficiency. With this capability, various data formats, such as XML, CSV, Excel, PDF, EDIFACT, and more, can be seamlessly converted within the SAP ERP environment.

Furthermore, advantageously, the present invention enables automated order capture with specific validations, all without the necessity of sharing sensitive business data on a third-party system. This functionality not only improves security but also simplifies the order capture process for users. By integrating directly with the SAP ERP system, the present invention ensures data integrity and consistency while providing a user-friendly interface for users to capture orders efficiently.

Therefore, the present invention contributes to cost savings, process automation, and enhanced data security within the SAP ERP environment while empowering businesses to streamline sales operations, improve productivity, and adapt to changing market demands without the need for complex middleware solutions or external development resources.

According to an exemplary embodiment, the present invention is implemented as a system for e-order and e-invoice management, which helps businesses and organizations manage and process large quantities of data efficiently, reducing the technical complexity associated with such systems. The system includes at least one ERP module integrated with a cockpit interface, where the cockpit interface provides a graphical user interface (GUI) for user interaction.

A plurality of legacy systems is connected to the SAP application, either directly or through a middleware module. These legacy systems can include customer systems, value-added networks (VAN), web portals, and similar. The middleware module can convert unprocessed data from these systems into a format recognizable by the SAP standard.

The cockpit system includes modules for sales order extraction, validation, error detection, bot automation, order creation, data storage, and analytics. The sales order extraction module processes incoming data to extract individual sales orders and items. The validation module checks the data against predefined rules to ensure accuracy. The error detection and bot modules handle errors by identifying and resolving issues automatically. The order creation module facilitates the creation of sales orders, e-invoices, and vendor invoices, while the data storage module securely stores this information.

The analytics module provides users with dashboards for monitoring and analyzing sales order data, enhancing decision-making and operational efficiency. The system supports various document formats and communication protocols, ensuring compatibility with diverse business environments.

This invention provides a robust and automated solution for managing e-orders and e-invoices, enhancing efficiency, accuracy, and ease of use in handling sales data within SAP environments.

The novel features believed to be characteristic of the invention, both as to its organization and method of operation, together with further objects and advantages, will be better understood from the following description when considered in connection with the accompanying figures. It is expressly understood, however, that each of the figures is provided for illustration and description only and is not intended as a definition of the limits of the present invention. For a more complete understanding of the present invention, reference is now made to the following descriptions taken in conjunction with the accompanying drawings.

BRIEF DESCRIPTION OF DRAWINGS

The present invention will become clearly understood to those of ordinary skill in the art when descriptions of exemplary embodiments thereof are read with reference to the accompanying drawings.

FIG. 9C illustrates the Pre-Sales Monitoring Report interface in accordance with an embodiment of the present invention.

DETAILED DESCRIPTION OF THE INVENTION

The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention. For a more complete understanding of the present invention, reference is now made to the following descriptions taken in conjunction with the accompanying drawings.

The present invention is capable of automatically converting document formats within the SAP enterprise resource planning (ERP) system eliminating the need for a middleware system or a consulting entity to perform the development process. This streamlined process reduces costs and complexity while enhancing efficiency. With this capability, various data formats, such as XML, CSV, Excel, PDF, EDIFACT, and more, can be seamlessly converted within the SAP ERP environment.

Furthermore, advantageously, the present invention enables automated order capture with specific validations, all without the necessity of sharing sensitive business data on a third-party system. This functionality not only improves security but also simplifies the order capture process for users. By integrating directly with the SAP ERP system, the present invention ensures data integrity and consistency while providing a user-friendly interface for users to capture orders efficiently.

Therefore, the present invention contributes to cost savings, process automation, and enhanced data security within the SAP ERP environment while empowering businesses to streamline sales operations, improve productivity, and adapt to changing market demands without the need for complex middleware solutions or external development resources.

Figure 1:
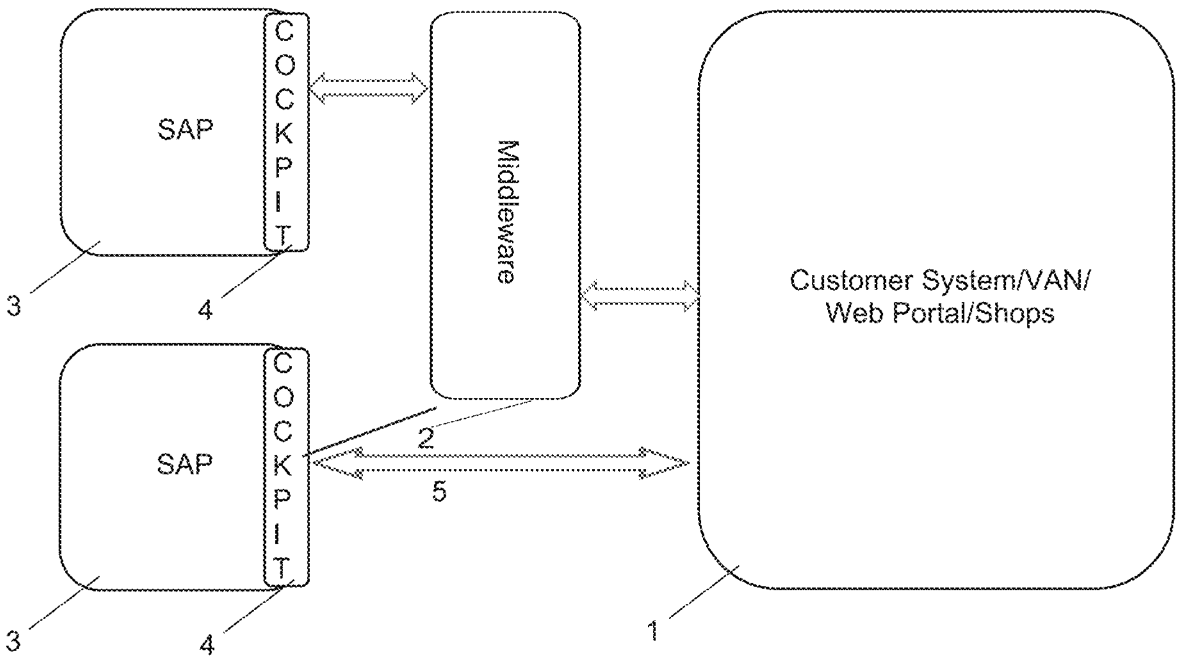
FIG. 1 is a high level block diagram of a system for e-order and e-invoice order management according to an embodiment of the present invention.

According to an exemplary embodiment, the present invention is implemented as a system for e-order and e-invoice management, as shown in FIG. 1. This system helps businesses and organizations manage and process large quantities of data efficiently, reducing the complexity associated with such systems. The system includes at least one ERP module 3, integrated with a cockpit interface 4, also referred to as a cockpit system 4, featuring a graphical user interface (GUI). The ERP module 3 is also referred to as a SAP application 3. For clarity, the description uses a single SAP application 3, though in some embodiments, a plurality of SAP applications 3 may be used instead. The cockpit interface 4 integrated with the SAP application 3 is operably coupled with a middleware module 2. The middleware module can include one or more of the following: PI, PO, Lobster, Webmethods, GXS-Opensource, and Gentrains.

A plurality of legacy systems 1 are connected to the SAP application 3, either directly or through the middleware module 2. The legacy systems 1 include at least one of the following: customer systems, value-added networks (VAN), web portals, and similar systems. These legacy systems 1 send unprocessed sales data to the SAP application 3. In one aspect, the SAP application 3 receives the unprocessed sales data directly through the cockpit interface 4. In another aspect, the SAP application 3 receives the unprocessed sales data through the cockpit interface 4 via the middleware module 2. The middleware module 2 converts the unprocessed data into processed data, which is in a format recognizable and attributable to a target SAP standard.

Figure 8:
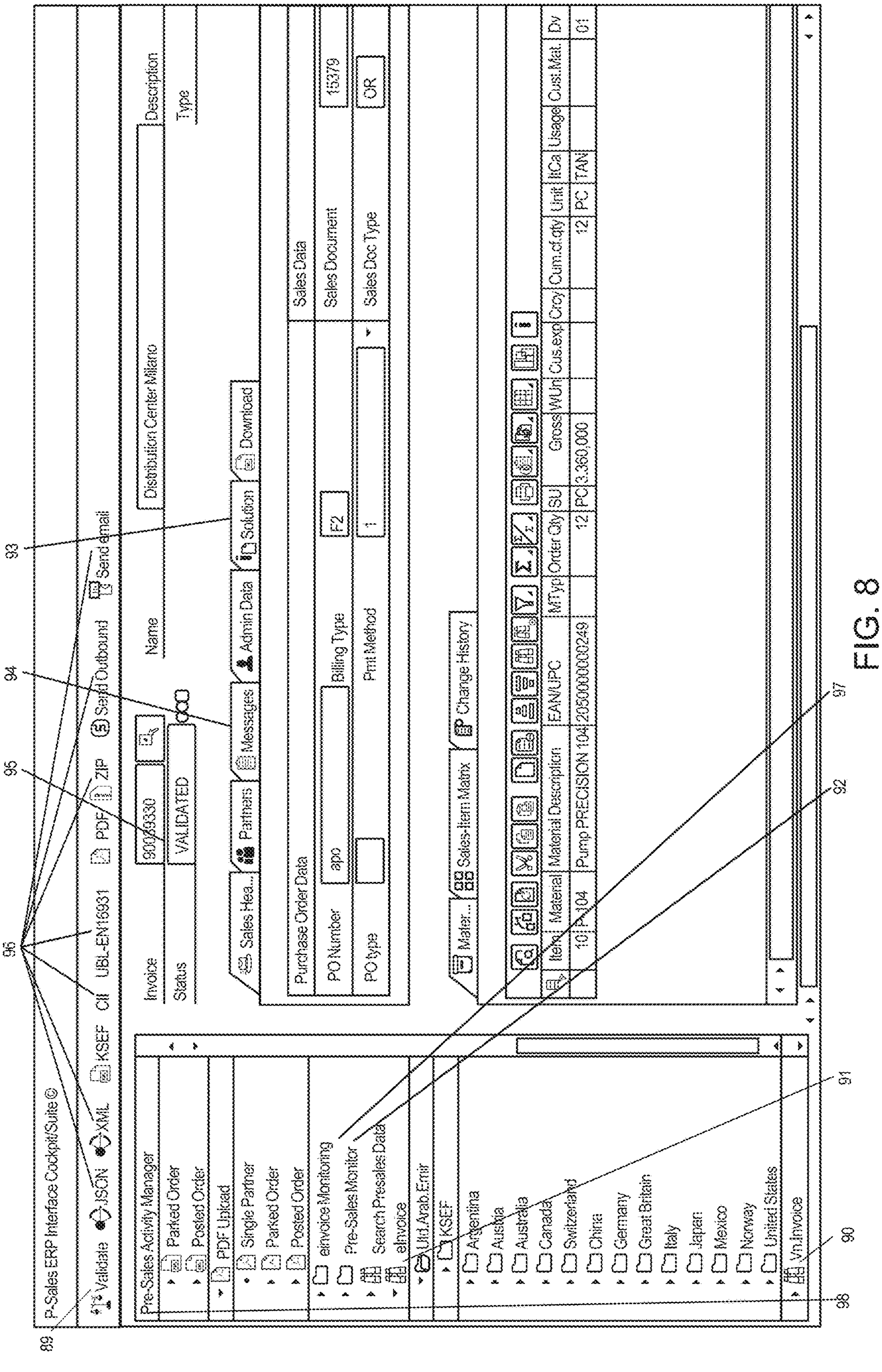
FIG. 8 depicts a user interface of the system of FIG. 1 in accordance with an embodiment of the present invention.

Referring FIG. 1, a system for e-order and e-invoice management is disclosed depicting a process flow in the system. The system includes a e-order and e-invoice management tool 1. The tool 1 includes a middleware module 2 and an ERP module 3 which is integrated with a cockpit system 4. A legacy system 1 of a plurality of legacy systems is connected to the middleware module 2. The middleware module 2 is operably coupled to the ERP module 3. The cockpit system 4 includes a graphical user interface (GUI) where a user processes and monitors e-order related data. The GUI of the cockpit system 4 is shown in FIG. 8 as a cockpit interface 80.

In an aspect, the ERP module 3 receives unprocessed sales data in the cockpit interface 4 via the middleware module 2. In same aspect, the middleware module 2 converts the unprocessed data into processed data. The processed data includes a data format recognizable and attributable to a target SAP standard. The cockpit system 4 includes a sales order extraction module, a validation module, an error detection module, a bot module, an order creating module, a data storage module and an analytics module.

The sales order extraction module extract input data from the processed data as a plurality of individual data, wherein the input data includes a plurality of sales order header and sales order items. The validation module validates 5 the input data based on validation rules either in real time or offline. The validation module validates the input data by applying validation rules to the input data based on one or more sales document levels. In some aspects, the one or more sales document levels primarily include document category, sales organization and distribution channel, product number, currency, net, gross amount, customer number, EAN11, plant data and other business data needed to process sales orders and invoices.

Figure 2:
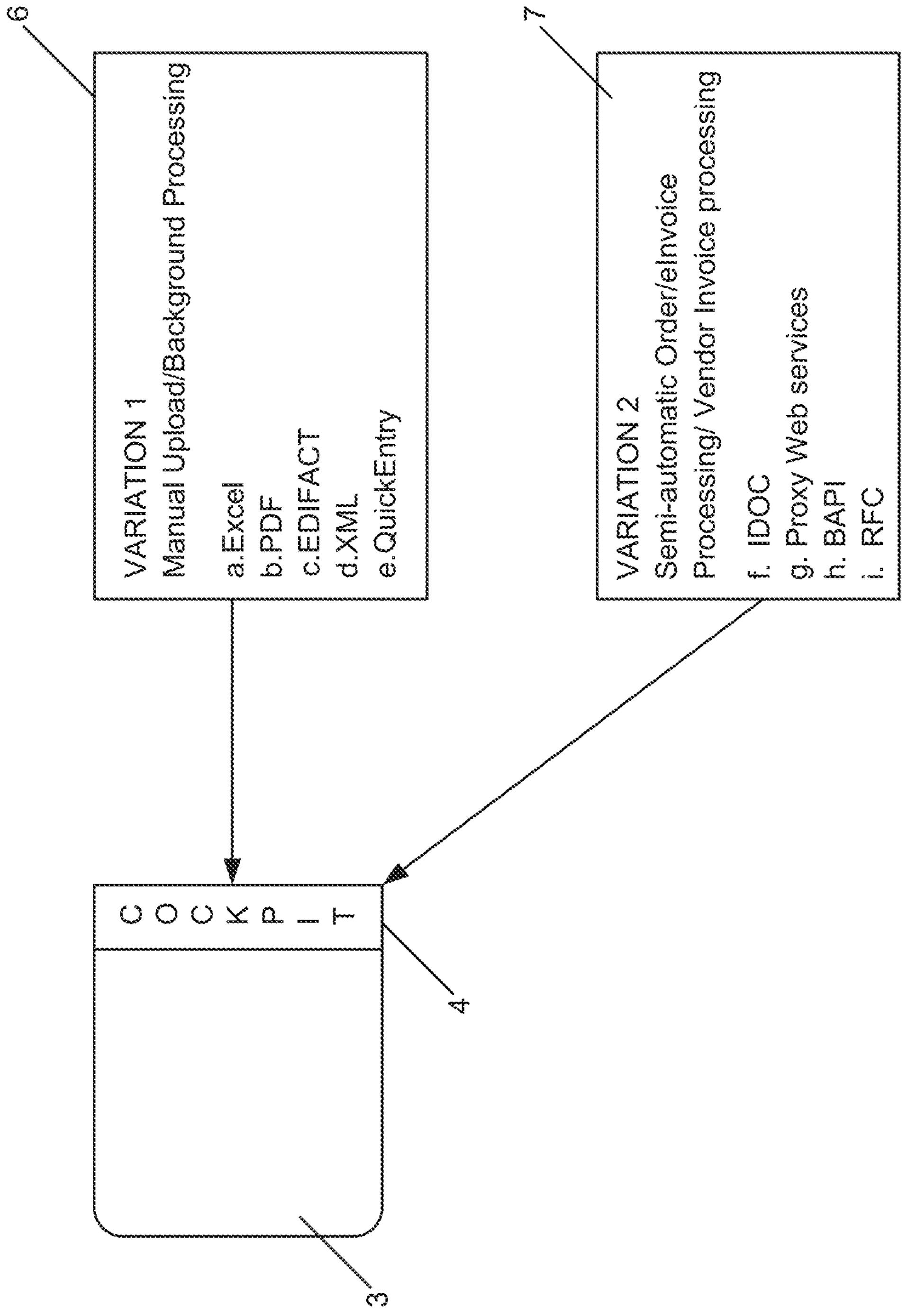
FIG. 2 is a block diagram of the part of the system of FIG. 1 depicting various embodiments of the present invention.

Referring FIG. 2, the block 6 represents manual upload/Background processing of data in different formats, and block 7 is for semi-automatic order/eInvoice Processing/vendor invoice processing which represents formats/protocols used by system the cockpit to process the messages inside of the cockpit for vendor invoicing, einvoicing and purchase order processing.

Figure 3:
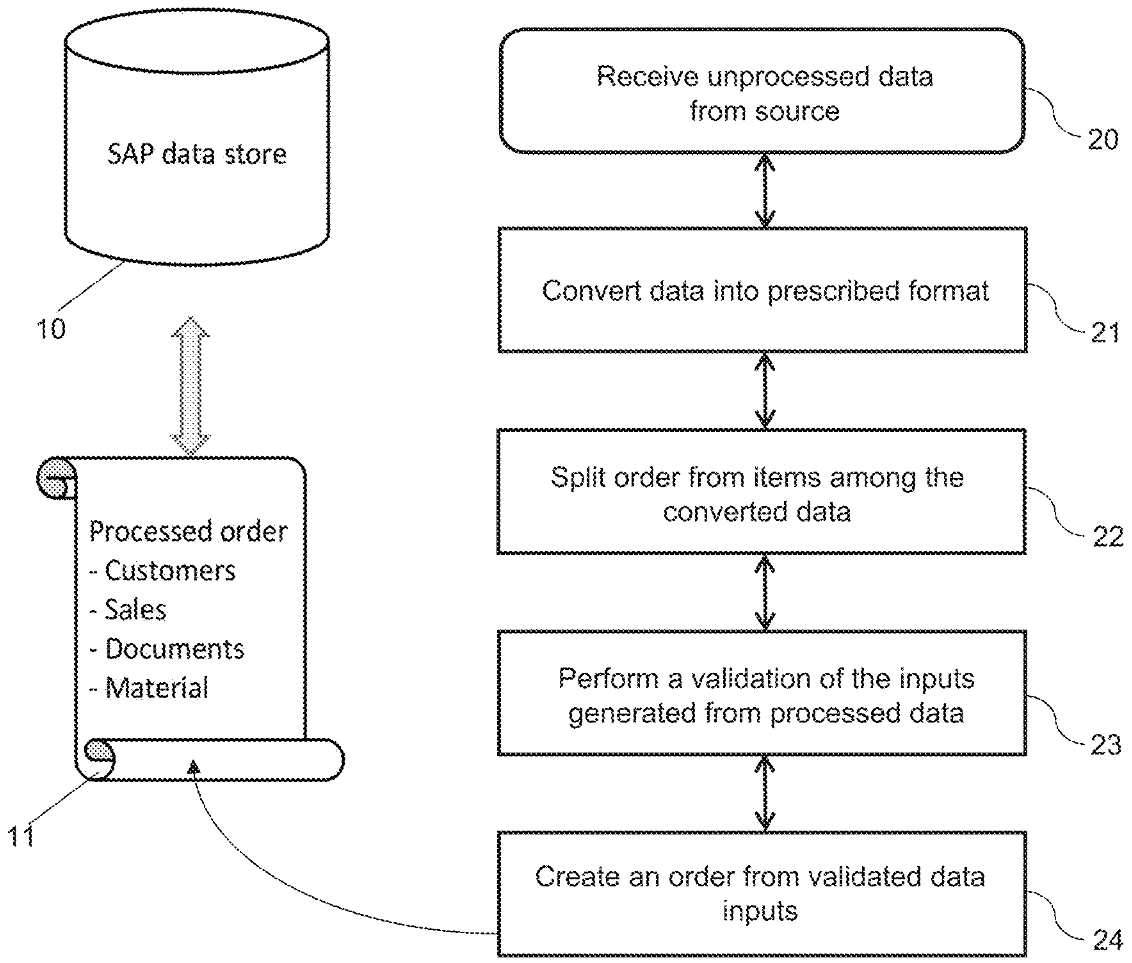
FIG. 3 is a flowchart illustrating a process of creating a sales order in accordance with an embodiment of the present invention.

FIG. 3 is a flowchart illustrating a process of creating a sales order in accordance with an embodiment of the present invention. Referring to FIG. 3, a method for e-order and e-invoice management is disclosed. The method is performed using a system or tool 1, which manages the process efficiently and accurately. At step 20, a plurality of unprocessed sales data is received by a SAP application. This unprocessed sales data is typically sent from an external legacy system. In some embodiments, multiple SAP applications may be used instead of a single SAP application to receive the unprocessed sales data. At step 21, the unprocessed data is converted into processed data. This conversion can be achieved using middleware, or it can be done without middleware, depending on the specific implementation. The processed data is formatted in a way that is recognizable and attributable to a target SAP standard. At step 22, the converted data is split into individual order items. This step ensures that the data is organized and prepared for subsequent processing. At step 23, a plurality of input data is generated from the processed data. This input data includes both individual and groups of data, comprising sales order headers and sales order items. At step 24, orders are created from the validated data inputs. This step finalizes the creation of sales orders based on the processed and organized data.

Figure 4:
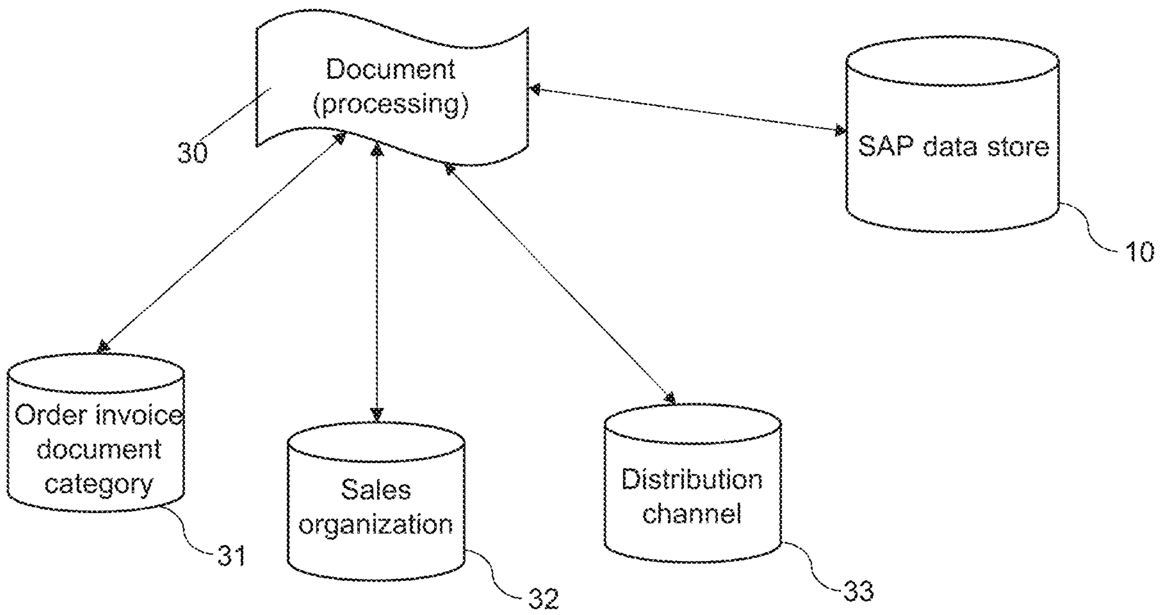
FIG. 4 is a flow diagram illustrating a process of applying sales order validation rules in accordance with embodiments of the present invention.

Referring FIG. 4 the levels at which sales order validation rules for a sales order document (Processing) 30 are applied is shown. The sales order validation rules are applied at the levels of sales document category 31, sales organization 32, distribution channel 33 and then the document 30 is stored in a SAP data store 10. The sales order validation rules are applied at the following levels: Sales Document Category 31 involves categorizing the sales document to ensure it meets specific criteria and classification requirements. Sales Organization 32 pertains to the department within the company that is responsible for the sales and distribution of goods and services. The sales organization is tasked with designing the company's sales strategy and ensuring that it aligns with logistics and sales requirements. Distribution Channel 33 involves the various channels through which products are distributed, including wholesalers, retailers, distributors, and the internet. Each channel may have its own set of validation rules to ensure proper processing and compliance. Once the validation rules are applied at these levels, the sales order document 30 is stored in a SAP data store 10. The distribution channels include wholesalers, retailers, distributors, and the internet. The sales organization is responsible for the sales and distribution of goods and services and is designed to meet the sales requirements of the company. The selling unit is represented as a legal unit within the company. Additionally, the authorization concept is integrated into this process, enabling users who are assigned to a specific sales organization to view and edit documents, ensuring that only authorized personnel have access to sensitive sales order information.

Figure 5:
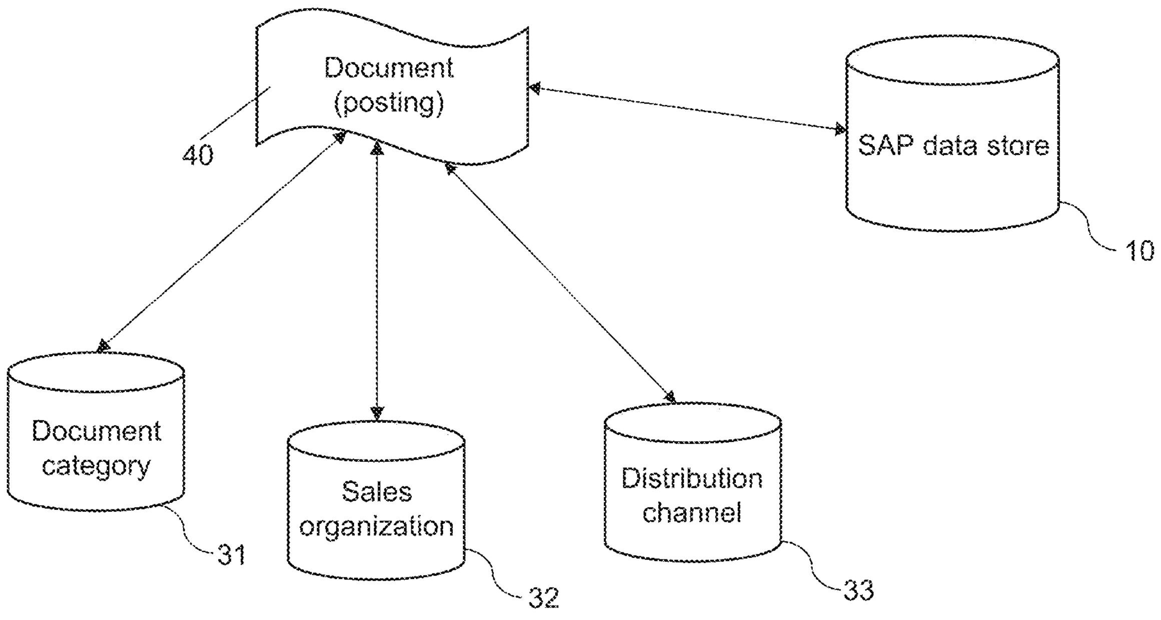
FIG. 5 is a flow diagram illustrating a process of applying posting rules in accordance with an embodiment of the present invention.

The tool 1 further includes a posting module. The posting module, upon validation, performs a rules-based posting of the input data at least in part in sales category, sales organization and distribution channel or any such business data. Referring FIG. 5 the levels at which posting rules 40 are applied is shown. The posting document validation rules are applied at the levels of document category 31, sales organization 32, distribution channel 33 and then stored in the SAP data store 10. The distribution channel 33 include wholesalers, retailers, distributors, and even the internet. On the other hand, the sales organization is a department in company within logistics that designs the company as per the sales requirements. It is held responsible for the sales and distribution of goods and services. Finally, the selling unit is represented as a legal unit. The function of the cockpit in this regard is to abstract the complexities that typically arises when trying to work with standard legacy systems to perform a similar task or tasks.

The error detection module detects one or more errors detected while validating the input data. The cockpit system 4 automatically executes the bot module to resolve one or more errors detected while validating the input data. In an aspect, the bot module resolves the one or more errors while validating, rejecting items in any order and posting to SAP. The bot module further sends the reasons for one or more errors to IT and business teams. The bot module segregates and assigns the one or more errors automatically to the respective teams and alerting them using email services automatically based on an authorization concept on sales data being sales organization, distribution channel and division.

In one embodiment, the system further includes an error response module to perform error response upon failure of the middleware validation or validation performed with the cockpit interface 4 for any named document format such as Excel, PDF, EDIFACT, RFC, BAPI, Web Proxy, CSV, XML, IDOC, outbound einvoicing, and inbound vendor invoicing.

The order creating module of the cockpit system 4 creates at least one of sales orders, outbound e-invoices and inbound vendor invoices, based on the extracted sales order header and sales order items. The sales order data includes a plurality of einvoices, vendor invoices, parked orders, posted orders, validation data and error reports of the user. The at least one of sales order, outbound e-invoices and inbound vendor invoices=is created either individually or in group. The data storage module stores the at least one of sales orders, outbound e-invoices and inbound vendor invoices. Upon creating the order, the middleware 2 sends one or more transactional documents related to the sales order to the ERP module 3, and the cockpit system 4 sends outbound e-invoices or inbound vendor invoices to one or more endpoints. The one or more transactional documents further includes one or more of confirmation, acknowledgement or receipt advise related to the sales orders, outbound e-invoices or inbound vendor invoices. The one or more transactional documents are sent via at least one of web technologies including REST API, SOAP such as HTTP or HTTPS or file transfer protocol, and email using different formats such as PDF, universal business language (UBL), XML, JSON, Zip files before or after validation.

The endpoints include a plurality of third-party systems, such as customers' client systems. The tool 1 further comprises an aggregation module for performing aggregation at a single interface of cockpit outputs. The analytics module displays a plurality of sales order data as a troubleshooting, monitoring, and analytical dashboard for the user, wherein the analytical module performs analysis of transactional data using external analytical tools such as Power BI.

Figure 6:
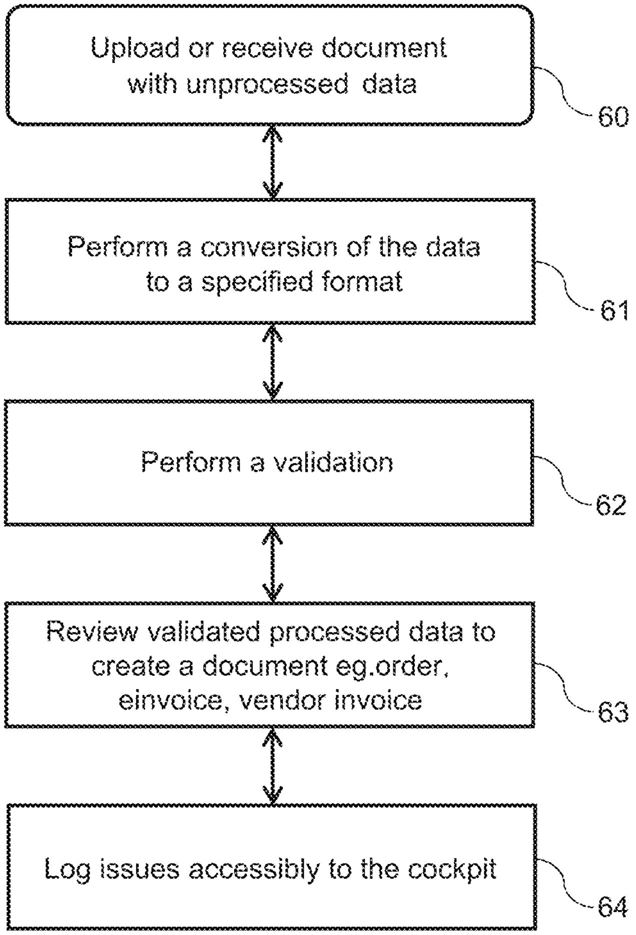
FIG. 6 is a flowchart illustrating a process of data validation in accordance with an embodiment of the present invention.

FIG. 6 presents a detailed flowchart delineating a method for data validation, as embodied in the present invention. This process ensures the accuracy and reliability of data prior to further processing, enhancing operational efficiency and reliability in various applications. The process involves the following steps: At 60, the process initiates with the upload or receipt of a document containing unprocessed data. At 61, the unprocessed data is then converted into a specified format to ensure compatibility and consistency. At 62, the converted data undergoes a rigorous validation process to detect and correct any errors or inconsistencies. At 63, after validation, the processed data is reviewed to create a document, such as an order, e-invoice, or vendor invoice, as required. At 64, any issues encountered during the process are logged and made accessible through the cockpit, ensuring transparency and facilitating prompt resolution.

Figure 7:
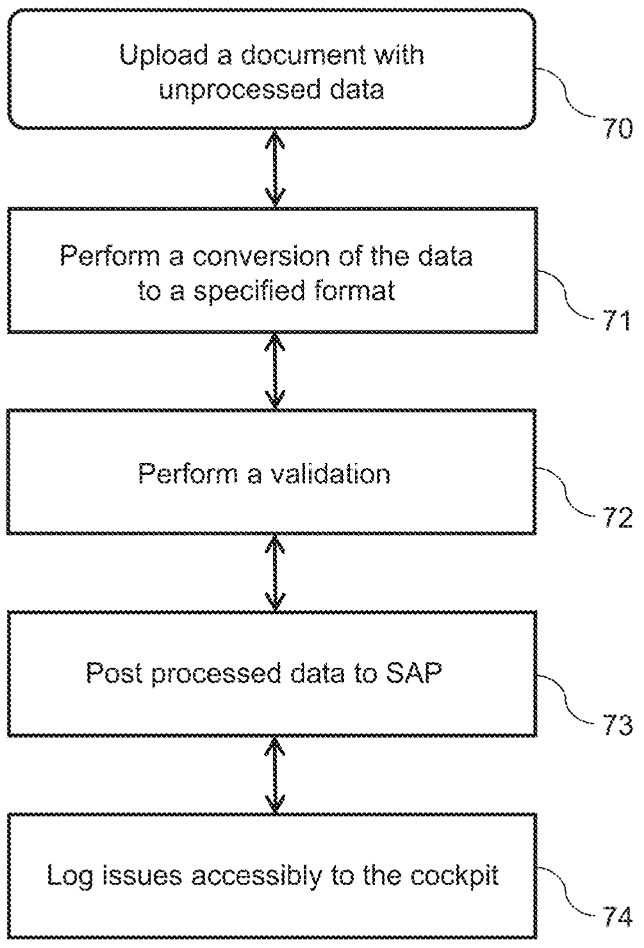
FIG. 7 is a flowchart illustrating a process of data validation in accordance with another embodiment of the present invention.

FIG. 7 is a flowchart illustrating a process of data validation in accordance with another embodiment of the present invention. This method ensures the integrity and accuracy of data before integration into SAP (Systems, Applications, and Products in Data Processing), a prominent enterprise resource planning (ERP) system. The process involves the following steps: At 70, the process begins with the upload of a document containing unprocessed data. At 71, the unprocessed data is converted into a specified format to ensure compatibility and consistency. At 72, the converted data undergoes a rigorous validation process to detect and correct any errors or inconsistencies. At 73, the validated and processed data is then posted to SAP (Systems, Applications, and Products in Data Processing), a widely used enterprise resource planning (ERP) system. At 74, any issues encountered during the process are logged and made accessible through the cockpit, ensuring transparency and facilitating prompt resolution.

As mentioned before, FIG. 8 depicts the GUI 80 of the cockpit system in accordance with an embodiment of the present invention. The GUI 80 is provided with a drop-down tree structure as pre-sales activity manager 98 for performing of activities related to the processes of this invention. The cockpit interface provides an input interface 98 capable of receiving inputs for a purchase order data, sales data, e-invoices, quick order entry and any other inputs as may be required to perform an order, e-invoice generation for the SAP application. Preferably, the provided functions include at least in part of a method to manually create a quick order entry pre_sales, and mass order provided for multiple partners, a method to allow users to quickly save/copy an existing sales pre-sales template. Another method allows users to create maps/templates for orders in the form of excel files, wherein two map types are provided in accordance to the current invention: single partner, i.e. sold-to-customer number and multiple partner, i.e. customers and a method to allow users to search for pre-sales by various fields such as material, customer, category among others.

Furthermore, the functions include a method to allow users to run reports 92, 97 against sales cockpit transactions, to perform a history log recording recently created pre_sales and user activities, a method for IDOCs navigation for monitoring 92, for monitoring of RFC messages and even further, a customer has the ability to specify proxies or web services. The provided features allow for various types of upload documents including 98: XML Upload, PDF upload, EDIFACT upload and Excel upload, BAPI, IDOC among other as may be necessary and acceptably converted with the said cockpit interface and coupled middleware or directly from customer system to SAP ERP system. The cockpit interface has the ability to perform error validation, create resolutions and infer type of data received, receive purchase order information and categorize the types of received orders, the status of orders and log changes performed by a user across all SAP all in one interface, which is a marked improvement upon all existing SAP.

The cockpit interface also provides solutions mentioned in 93 automatically the need of users to perform to troubleshoot the error and is freely customizable and error descriptions are better maintained by users and assigned to users who only monitor their assigned errors through a customizable table. This helps in rapid error resolution and reduces the communication and segregate IT related from business related. 89 represents the function when processing signal 91 einvoices parked showing 95 being yellow status (not yet validated), through 89 user able to determine the errors 94 shown logs and branch to a specific transaction using the solution tab 93 to resolve the problem. 95 shows the status of document 1. Not validated (red) 2. Validated (green) 3. Validating (yellow). 96 is triggered only when 95 is executed with green status freely definable. Customers receive format of invoices based on customizing performed by the end user and authorized to perform the same. Formats include emails, UBL (Universal Business Language), XML, PDF, Zipfiles-PDF and XML and combinations, CII (Cross Industry Invoice), SOAP, JSON invoices can be sent to endpoints or customers. 97 represents e-invoice monitoring in a single screen viewing all invoices in a single dashboard screen and executes manually or mass invoices in frontend by users. Simultaneously, users decide to execute a background job by processing in frontend, if the volume of e-invoices exceeds a certain limit for system performance and avoiding timeouts affecting the memory of the hardware.

Pre-sales monitor 92 refers to the standard interface of monitoring mass orders parked and displaying errors parked in a single dashboard. Vendor invoice 90 refers the invoices received from vendors electronically using web interface Rest API and are parked if errors occur. There is automatic posting facility which enables vendor invoices to post automatically without user intervention. e-invoice 91 reflects the single processing of einvoicing where users are allowed to perform monitoring of single invoices manually, validate, check, error fix, send invoices in various formats based on customers' requirements.

Therefore, the single pre-sales cockpit system coupled to the SAP via a plurality of middleware is configured in that a plurality of sales orders, einvoices and vendor invoices are automatically received and posted, processed and stored in the SAP application, thus providing robust vendor invoice management through SAP ERP systems while reducing the system complexity.

The input data is validated based on validation rules, in real time or offline. The validation step includes applying validation rules to the input data based on one or more sales document levels. The one or more sales document levels primarily include document category, sales organization and distribution channel, product number, currency, net, gross amount, customer number, EAN11, plant data and other business data needed to process sales orders and invoices. Upon validation, a rules-based posting of the input data is performed at least in part in sales category, sales organization and distribution channel or any such business data. One or more errors are determined upon validation of the input data. In response to determining the one or more errors, a bot is automatically executed to resolve one or more errors. In some aspects, the bot resolves the one or more errors while validating, rejecting items in any order and posting to SAP application. In some aspects, the bot sends the reasons for one or more errors to IT teams and business teams. In some other aspects, the bot segregates and assigns the one or more errors automatically to the respective teams and alerts them using email services automatically based on an authorization concept on sales data being sales organization, distribution channel and division.

In some embodiments, the method further includes performing an error response upon failure of the middleware validation or validation performed with the cockpit interface for any named document format such as Excel, PDF, EDIFACT, RFC, BAPI, Web Proxy, CSV, XML, IDOC, einvoice using PDF, JSON, UBL (Universal Business language) XML, and vendor invoices.

At least one of sales order, outbound e-invoices and inbound vendor invoices, are created based on the sales data header and sales data items and are stored, in a data storage module of the SAP application. In some aspects, the sales order data includes a plurality of outbound einvoices, inbound vendor invoices, parked orders, posted orders, validation data and error reports of the user. The at least one of sales order, outbound e-invoices and inbound vendor invoice is created either individually or in group. The transactional documents related to the sales order, outbound e-invoices or outbound vendor invoices are sent to one or more endpoints directly or via middleware. The transactional documents further includes one or more of confirmation, acknowledgement or receipt advise related to the sales order, outbound e-invoicing or inbound vendor invoice. The transactional documents are sent via at least one of web technologies including REST API, SOAP such as HTTP or HTTPS, file transfer protocol, and email using different formats such as PDF, universal business language (UBL), XML, JSON, Zip files before or after validation. The endpoints include a plurality of third party systems such as customers' client systems. In one aspect, the method includes performing an aggregation at a single interface of a plurality of SAP outputs. A plurality of sales order data are displayed as a troubleshooting, monitoring and analytical dashboard to the user.

Figure 9A:
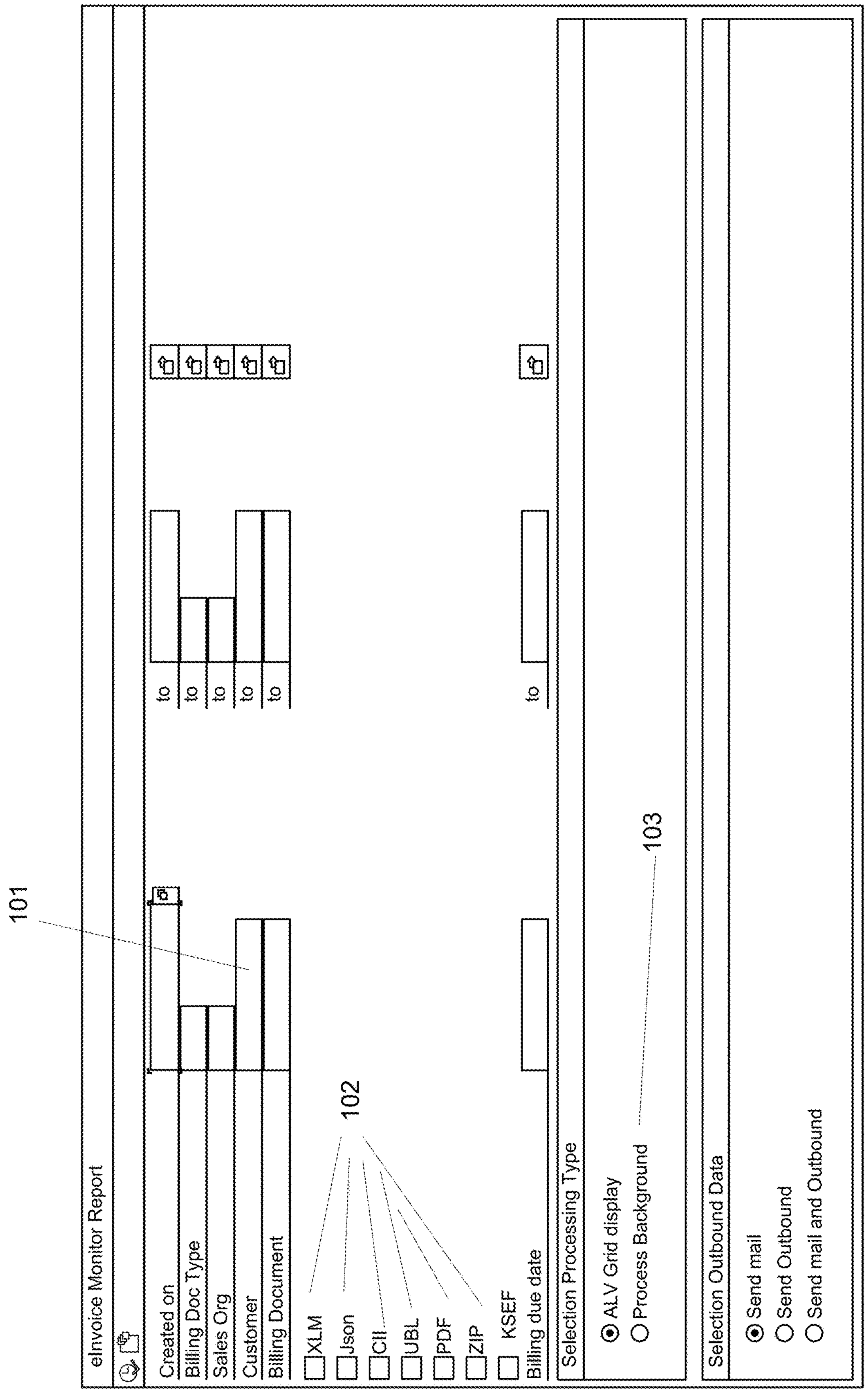
FIG. 9A illustrates an example interface of the e-Invoice Monitor Report in accordance with an embodiment of the present invention.

FIG. 9A illustrates an example interface of the e-Invoice Monitor Report 100, a tool designed to assist users in processing mass invoices in both foreground and background modes. This interface is part of the end-to-end sales order management system. The screen is divided into several sections:

Customer Filter Criteria (101) allows users to filter invoices based on specific customer criteria. This includes fields such as "Created on", "Billing Doc Type", "Sales Org", and "Customer". These filters help users narrow down the invoices to be processed according to the selected parameters.

Validation Based on Formats (102): This section displays various checkboxes for different billing document formats that require validation. The formats include XML, JSON, CII, UBL, PDF, ZIP, and KSEF. Users can select the appropriate formats that correspond to the invoices they need to process.

Processing Mass e-Invoices (103): This area is dedicated to the processing options. Users can choose to process invoices in the foreground (immediate processing) or use the background processing function for offline handling. This flexibility allows users to manage their workflow more efficiently based on their immediate needs and resource availability.

Billing Due Date: Users can specify a date range for billing due dates, further refining the invoices selected for processing.

Selection Processing Type: Two options are available: (1) ALV Grid Display: This option displays the invoices in an ALV (ABAP List Viewer) grid for easy viewing and manipulation. (2) Process Background: This option initiates background processing, allowing users to handle large volumes of invoices without occupying foreground processing resources.

Selection Outbound Data: Users can choose how the processed data should be handled. Options include: Send Mail: Emails the processed invoices, Send Outbound: Sends the processed data to an outbound system, and Send Mail and Outbound: Performs both actions, ensuring that the invoices are both emailed and sent to the outbound system.

The screen depicts in FIG. 9A helps to process mass invoices in foreground for users and choose specific invoices relevant for processing based on document formats for the specific customer. Also, lets them go in offline modus using background processing function. This interface significantly enhances the efficiency and accuracy of invoice processing by providing users with multiple options to filter, validate, and process large volumes of invoices in various formats, both in real-time and offline modes.

Figure 9B:
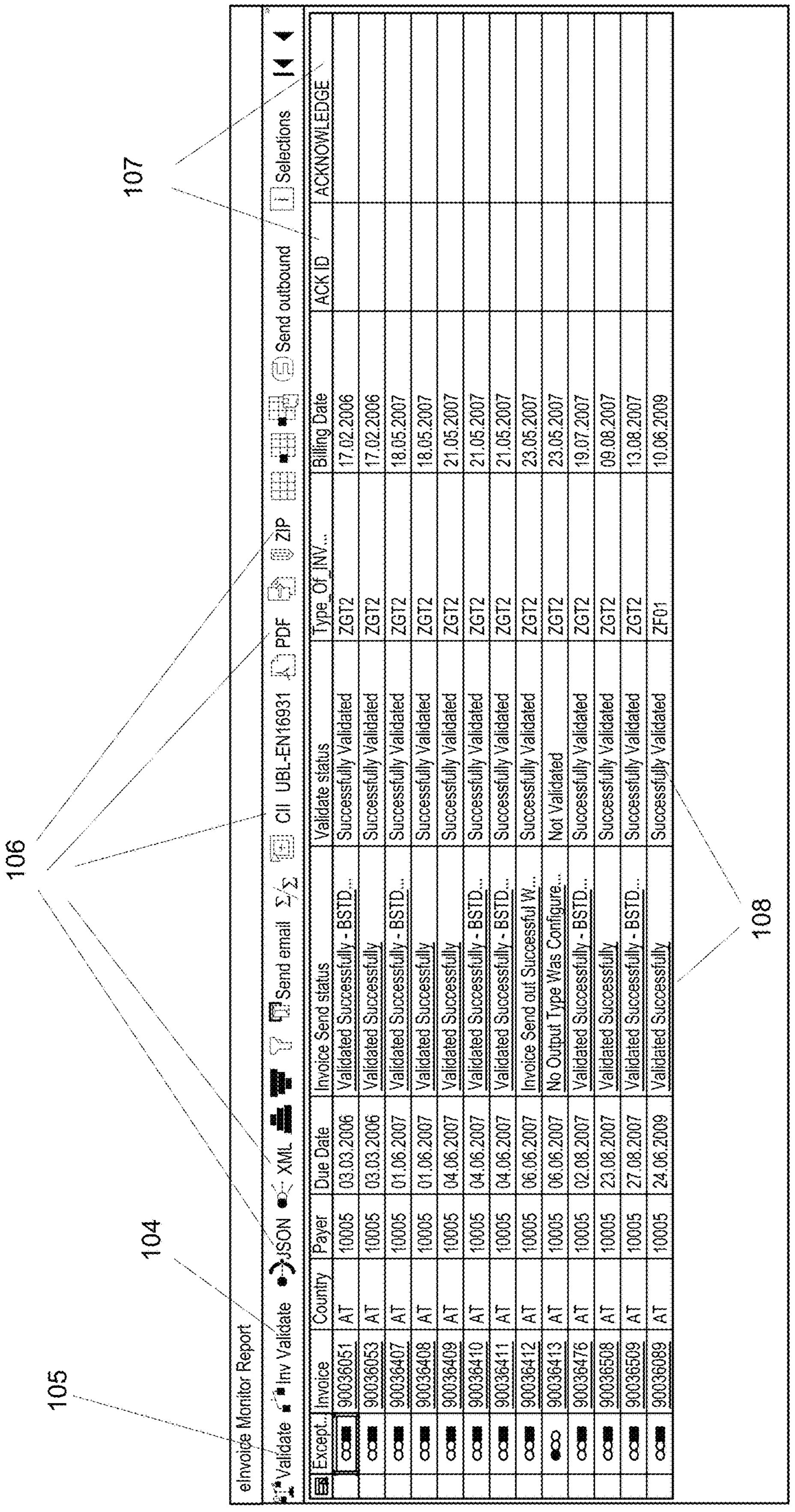
FIG. 9B illustrates a detailed interface of the e-Invoice Monitor Report in accordance with an embodiment of the present invention.

FIG. 9B illustrates a detailed interface of the e-Invoice Monitor Report 100, which is a crucial component of the end-to-end sales order management system. This interface enables users to efficiently manage and validate mass invoices through a single screen by utilizing specific business data parameters.

The screen is organized into several functional sections:

1. User can set specific rules for validation customizing (104): Users can set specific validation rules tailored for individual customers. This customization ensures that invoices meet the required standards before processing.
2. User can mark all invoices and validate (105): Users have the ability to mark all invoices or select specific ones for validation. The validation process checks the accuracy and completeness of the invoices against the predefined rules.
3. Download and Send Files (106): This section allows users to download invoices in various formats directly to their desktop. Additionally, users can send files using multiple methods such as email and web together, leveraging SOAP or REST API for sending files in multiple formats like XML, JSON, CII, UBL, PDF, ZIP, and others.
4. Response Back ID and Acknowledgement (107): The interface displays the response back ID, indicating the status of invoice receipt from the target system. It also shows the acknowledgment (ACK ID) from the receiving system, confirming the receipt and processing status of the invoice.
5. Invoice Send Status (108): This column indicates whether the invoice was sent and if it was successfully validated. it provides detailed status information, including “Validated Successfully”, “Invoice Send Out Successfully”, and any errors that occurred during validation or sending.
6. Updated Status Check: This feature allows users to check the updated status of invoices before sending them. It ensures that only validated invoices are sent and provides feedback on whether the invoices were successfully sent via web or email, along with the reasons for any failures.

The objective of this screen is to provide users with a comprehensive view of all invoices in one interface, based on specific business data parameters. It supports mass invoice processing by: Setting specific validation rules for customers, validating invoices efficiently, Sending invoices in various formats using multiple transmission methods, receiving real-time or offline acknowledgments from target systems or customers, checking and updating the status of invoices before sending, ensuring successful transmission and validation.

This interface depicts in FIG. 9B significantly enhances the efficiency, accuracy, and reliability of the invoice processing workflow within the end-to-end sales order management system.

FIG. 9C illustrates the Pre-Sales Monitoring Report interface 200, which is an essential component of the end-to-end sales order management system. This screen is specifically designed for robotic process automation (RPA) to efficiently process and convert pre-sales documents from unprocessed to processed data.

The BOT processing screen for RPA where automatically from top to bottom the pre-sales Documents are processed and convert unprocessed data to processed data. Here the BOT picks up from top to bottom only the yellow status icons meaning not processed. All types of document types are displayed user specific such as BAPI, PDF etc. Sales document nr. Column when filled shows it is processed and shows status green.

The screen depicting in FIG. 9C facilitates automated processing by the BOT, which systematically works from top to bottom. It picks up documents marked with yellow status icons, indicating they are not yet processed, and processes them in sequence. The interface uses status icons to indicate the processing state of each document. Yellow icons denote unprocessed documents, while green icons show processed documents. This visual cue allows users to quickly identify the processing status at a glance.

Sales Document Number Column is crucial for tracking the processing status. When filled, it indicates that the document has been processed, and the status icon changes to green. This helps users verify that the document has been successfully converted and processed. The report displays various document types, such as BAPI, PDF, EDIFACT, and others, which are user-specific. This flexibility ensures that different formats can be handled according to the requirements of different users or departments.

Each row provides comprehensive information about the pre-sales documents, including: IDoc Number, Number Detail, Pre-Sales Document Number, Sales Document Number: The identifier for the sales document, indicating processing completion, PO Date and Request Delivery Date, Customer Information, Net Value and Currency, Transaction Code (TCode), Message Type, and Order Type.

The screen shown in FIG. 9C is to provide a streamlined, automated process for handling pre-sales documents. This interface ensures an efficient, accurate, and automated workflow for converting pre-sales documents, thus optimizing the end-to-end sales order management process.

Figure 10:
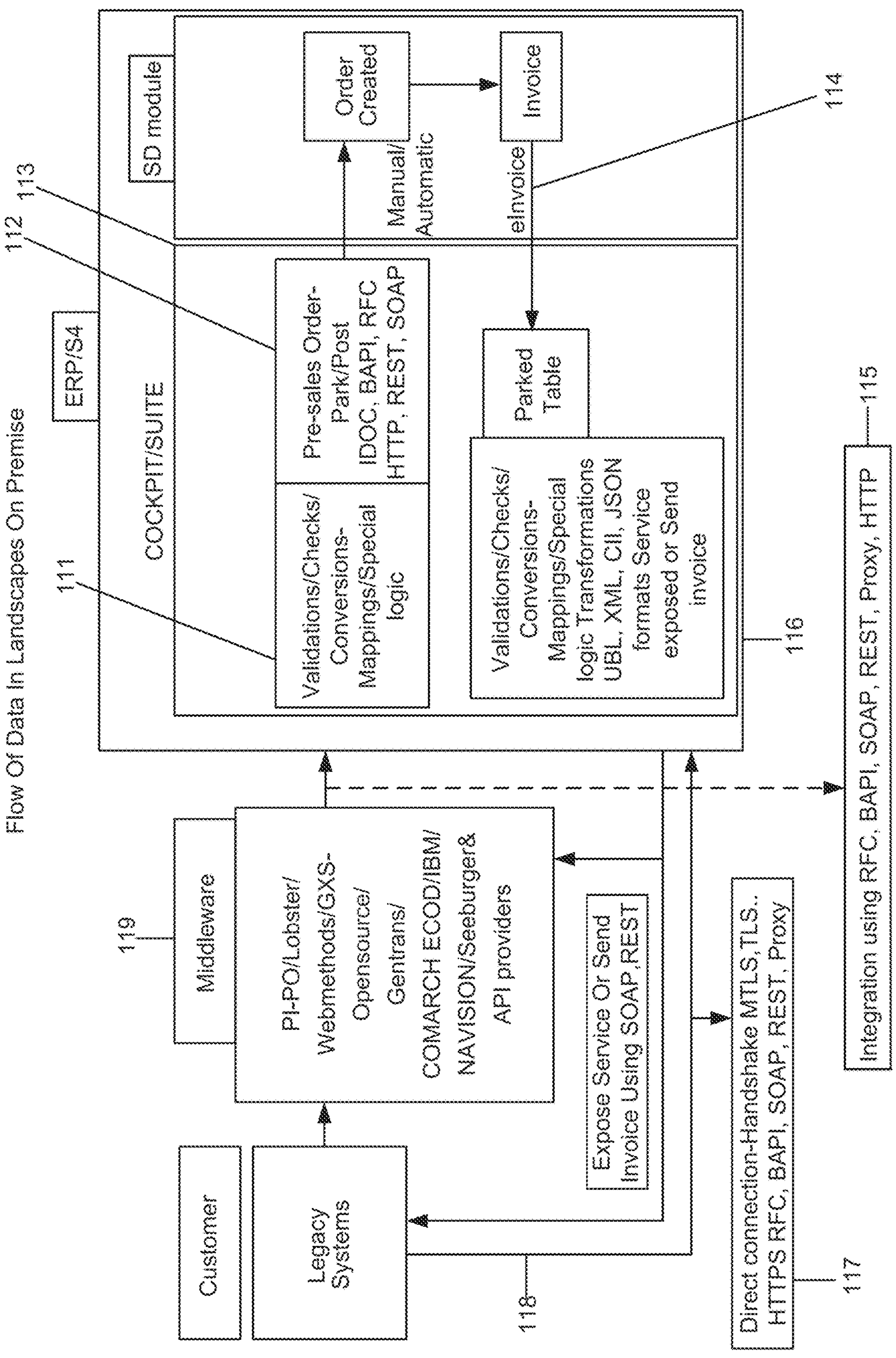
FIG. 10 is a flow diagram illustrating a process of sales order management implemented using the system of FIG. 1.

FIG. 10 is a flow diagram illustrating a process of sales order management implemented using the system of FIG. 1. The diagram details the interaction between various components involved in the sales order management process, from legacy systems to the final invoicing. The process begins with the customer interfacing with legacy systems. These systems send or receive invoices via SOAP or REST services 118. Middleware 119 facilitates the integration between legacy systems and the ERP/S4 system. This middleware can include various platforms such as PI-PO, Lobster, Webmethods, GXS-Opensource, Gentrans, COMARCH ECOD, IBM/NAVISION/Seeburger, and API providers. The middleware ensures proper data handling and conversion through validations, checks, mappings, and special logic before transmitting the data to the ERP/S4 system.

ERP/S4 System: The core ERP/S4 system 111 includes a cockpit/suite that handles different stages of the sales order process: This stage involves validations, checks, conversions, and mappings using IDOC, BAPI, RFC, HTTP, REST, and SOAP protocols. Orders are either parked or posted based on the logic applied. The SD module 113 handles the creation of orders, which can be done manually or automatically. Once an order is created, it leads to the generation of an invoice 114. Invoices can be sent to customers through e-invoice 112 systems, ensuring proper validation and transformation of data into formats like UBL, XML, CII, and JSON before sending. The system allows direct connections using secure protocols 117 such as MTLS, TLS, HTTPS, RFC, BAPI, SOAP, REST, and Proxy. It ensures integration of services 115 through these protocols, maintaining data integrity and security. A parked table 116 within the ERP/S4 system temporarily holds data that requires further validation, transformation, or processing before final invoicing or service exposure. Overall, FIG. 10 encapsulates the seamless flow of data in sales order management, from customer interactions through middleware, ERP/S4 processing, to the final invoicing, ensuring efficiency and accuracy throughout the process.

It will finally be understood that the disclosed embodiments are presently preferred examples of how to make and use the claimed invention, and are intended to be explanatory rather than limiting the scope of the invention as defined by the claims below. Reasonable variations and modifications of the illustrated examples in the foregoing written specification and drawings are possible without departing from the scope of the invention as defined in the claim below. It should further be understood that to the extent the term "invention" is used in the written specification, it is not to be construed as a limited term as to number of claimed or disclosed inventions or the scope of any such invention, but as a term which has long been conveniently and widely used to describe new and useful improvements in technology. The scope of the invention supported by the above disclosure should accordingly be construed within the scope of what it teaches and suggests to those skilled in the art, and within the scope of any claims that the above disclosure supports. The scope of the invention is accordingly defined by the following claims.

This application is intended to cover any adaptations or variations of the present invention. Therefore, it is manifestly intended that this invention be limited only by the claims and the equivalents thereof.

I claim:

1. A processor executable method for managing sales orders using an e-order and e-invoice sales order management system:

wherein the e-order and e-invoice sales order management system comprises:

at least one processor, wherein the at least one processor is configured to execute processor readable instructions, at least one memory, wherein the at least one memory is in operative connection with the processor and includes processor executable instructions that, when executed by the at least one processor cause the at least one processor to perform the method, at least one display screen, wherein the at least one display screen is in operative connection with the processor, and wherein the at least one processor is configured to display at least one visual output on the display screen, the method comprising:

providing, via the at least one processor and at least one display screen in operative connection with the processor, a graphical user interface (GUI) within the sales order management system, wherein the graphical user interface (GUI) enables a user to interact with the system;

performing, by a user of the system via the at least one processor and at least one user input through the graphical user interface (GUI), one or more steps of the sales order management process, wherein the steps include creating, modifying, and processing e-orders and e-invoices;

receiving, via the at least one processor, a plurality of unprocessed sales data in a SAP application, wherein the unprocessed sales data is sent by an external legacy system;

storing in the at least one memory in operative connection with the processor, the plurality of unprocessed sales data;

converting, using a middleware executable by the at least one processor or without using a middleware, the unprocessed data into processed data, wherein the processed data includes a data format recognizable and attributable to a target SAP standard;

generating, via the at least one processor, input data from the processed data as individual and groups of data, wherein the input data includes a plurality of sales order header and sales order items;

validating, via the at least one processor, based on validation rules stored in the at least one memory, the input data in real time or offline;

determining, via the at least one processor, one or more errors upon validation of the input data;

in response to determining the one or more errors, automatically executing via the at least one processor a bot to resolve one or more errors;

creating via the at least one processor and storing in the at least one memory at least one of sales order, outbound e-invoices and inbound vendor invoices, based on the sales order header and sales data order items, in a data storage module, of SAP application;

sending, via the at least one processor, transactional documents related to the sales order, outbound e-invoices or outbound vendor invoice to one or more endpoints directly or via middleware; and displaying, via the at least one display screen, a plurality of sales order data as a troubleshooting, monitoring and analytical dashboard for the end users.

2. The method according to claim 1, wherein the validating includes applying validation rules to the input data at one or more sales document levels which include document category, sales organization and distribution channel, product number, currency, net, gross amount, customer number, EAN11, plant data and other business data needed to process sales orders and invoices.

3. The method according to claim 1, further comprising performing an aggregation at a single interface of a plurality of SAP outputs.

4. The method according to claim 1, wherein the bot resolves the one or more errors while validating, rejecting items in any order and posting to SAP.

5. The method according to claim 1, further comprising bot sending the reasons for one or more errors to IT teams and business teams, and bot segregating and assigning the one or more errors automatically to the respective teams and alerting them using email services automatically based on an authorization concept on sales data being sales organization, distribution channel and division.

6. The method according to claim 1, further comprising performing an error response upon failure of the middleware validation or validation performed with the cockpit interface for any named document format such as Excel, PDF, EDIFACT, RFC, BAPI, Web Proxy, CSV, XML, IDOC, einvoice using PDF, JSON, UBL (Universal Business language) XML, and vendor invoices.

7. The method according to claim 1, wherein the at least one of sales order, outbound e-invoices and inbound vendor invoice is created either individually or in group.

8. The method according to claim 1, wherein the transactional documents further includes one or more of confirmation, acknowledgement or receipt advise related to the sales order, outbound e-invoicing or inbound vendor invoice, and the transactional documents are sent via at least one of web technologies including REST API, SOAP such as HTTP or HTTPS, file transfer protocol, and email using different formats such as PDF, universal business language (UBL), XML, JSON, Zip files before or after validation.

9. The method according to claim 1, wherein the sales order data includes a plurality of outbound invoices, inbound vendor invoices, parked orders, posted orders, validation data and error reports of the user.

10. A system for managing sales orders and electronic invoices, comprising:

a processor;

a memory storing instructions executable by the processor;

an SAP ERP system comprising a sales order processing module and a data storage module;

a cockpit add-on operably coupled to and executable within the ERP system, the cockpit add-on comprising:

a graphical user interface configured to process, monitor, manage and display sales order data, electronic invoice data and vendor invoice data;

a transaction processing engine configured to receive transaction data from one or more external legacy systems and transform the transaction data into SAP-compatible transaction data;

wherein the transaction processing engine is configured to communicate directly with the ERP system or through an optional middleware platform;

a sales order extraction module configured to extract sales order header data and sales order item data from the SAP-compatible transaction data;

a validation module configured to apply validation rules to the extracted transaction data;

an error detection module configured to identify validation exceptions generated by the validation module;

a bot module operably coupled to the validation module and the error detection module, the bot module configured to automatically process validation exceptions according to predefined processing rules, perform corrective processing, initiate transaction reprocessing, assign detected exceptions, and generate notifications associated with the detected exceptions;

a storage structure comprising a parked transaction table and a data storage module configured to temporarily retain transaction data during validation, exception processing, posting, invoice generation and transmission;

an order creation module configured to generate sales orders, outbound electronic invoices and inbound vendor invoices from validated transaction data;

a communication interface operably coupled to the transaction processing engine and configured to exchange transaction data with external systems, ERP systems and optional middleware platforms using one or more of REST, SOAP, RFC, BAPI, HTTP, HTTPS, XML, IDOC, JSON or UBL communications;

an analytical module configured to generate troubleshooting, monitoring and analytical information for display through the graphical user interface;

wherein the transaction processing engine, sales order extraction module, validation module, error detection module, bot module, storage structure, order creation module, communication interface and analytical module are operably interconnected within the cockpit add-on to perform transaction transformation, validation, exception handling, monitoring, routing and transaction processing within the ERP system, thereby reducing dependency upon external middleware while maintaining interoperability with external legacy systems and optional middleware platforms.

11. The system according to claim 10, wherein the validation module validates the transaction data by applying validation rules to the input data at one or more sales document levels which include document category, sales organization and distribution channel.

12. The system according to claim 10, further comprising a posting module to perform a rules-based posting of the transaction data at least in part in sales category, sales organization and distribution channel or any such business data.

13. The system according to claim 10, further comprising an aggregation module to perform aggregation at a single interface of a plurality of cockpit add-on outputs.

14. The system according to claim 10, wherein the bot resolves the exceptions while validating, rejecting items in any order and posting to SAP.

15. The system according to claim 10, further comprising bot sending the reasons for one or more errors to IT teams and business teams, and bot segregating and assigning the exceptions automatically to the respective teams and alerting them using email services automatically based on an authorization concept on sales data being sales organization, distribution channel and division.

16. The system according to claim 10, further comprising an error response module to perform error response upon failure of the validation or validation performed with the cockpit add-on for any named document format such as Excel, PDF, EDIFACT, RFC, BAPI, Web Proxy, CSV, XML, IDOC, einvoicing, and vendor invoicing.

17. The system according to claim 10, wherein the transactional data further includes one or more of confirmation, acknowledgement or receipt advice related to the sales order, outbound e-invoices or inbound vendor invoice, and the transactional documents are sent via at least one of web technologies including REST API, SOAP such as HTTP or HTTPS or file transfer protocol, and email using different formats such as PDF, universal business language (UBL), XML, JSON, Zip files before or after validation.

18. The system according to claim 10, wherein the sales order transaction data includes a plurality of einvoices, vendor invoices, parked orders, posted orders, validation data and error reports of the user.

19. A computed implemented method for managing sales orders using an e-order and e-invoice sales order management system, the sales order management system comprising:

a middleware module connected to at least one legacy system, an SAP application operably coupled to the middleware module, and a cockpit system associated with the SAP application, wherein the cockpit system comprises a graphical user interface, a sales order extraction module, a validation module, an error detection module, a bot module, an order creation module, and a data storage module, the method comprising:

receiving, from the at least one legacy system, unprocessed sales data in a first data format;

converting, by the middleware module, the unprocessed sales data into processed sales data having a second data format recognizable and attributable to a target SAP standard;

transmitting the processed sales data from the middleware module to the cockpit system associated with the SAP application;

extracting, by the sales order extraction module of the cockpit system, input data from the processed sales data, wherein the input data comprises a sales order header and a plurality of sales order items;

storing the extracted sales order data in the data storage module;

validating, by the validation module, the extracted sales order data by applying stored validation rules at one or more sales-document levels comprising a sales document category, a sales organization, and a distribution channel;

determining, by the error detection module, one or more errors;

in response to determining the one or more errors, automatically executing the bot module to resolve at least one of the one or more errors while the extracted sales order data is being validated;

rejecting, by the bot module, one or more sales order items containing an unresolved error prior to posting to the SAP application;

transmitting, by the bot module, information identifying the one or more unresolved errors to an information-technology team or business team;

after validating the input data, creating, by the order creation module, a sales order based on the validated sales order header and sales order items; and transmitting the created sales order to the SAP application for posting in the SAP application.

* * * * *